UNITED STATES PATENT OFFICE.

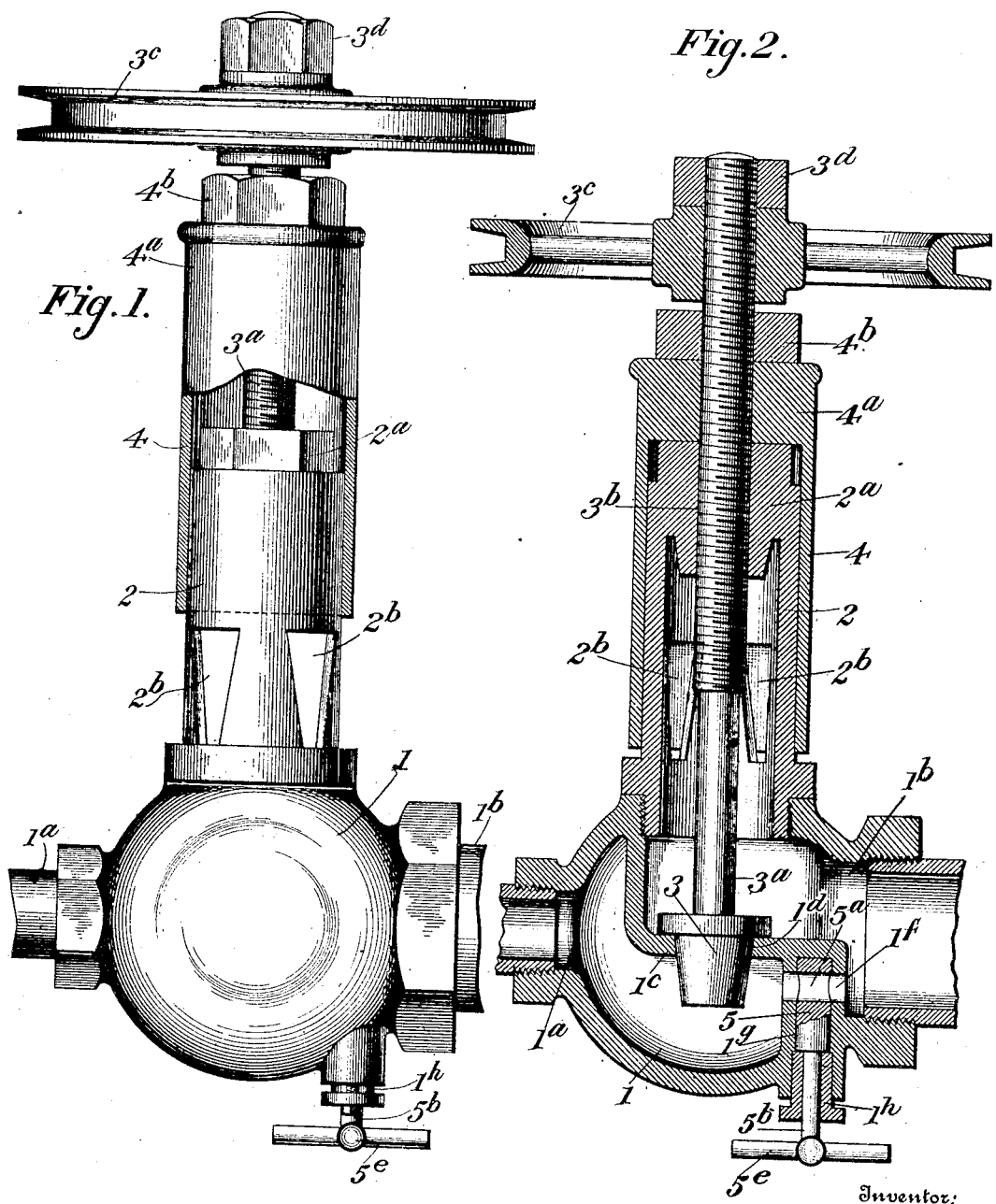

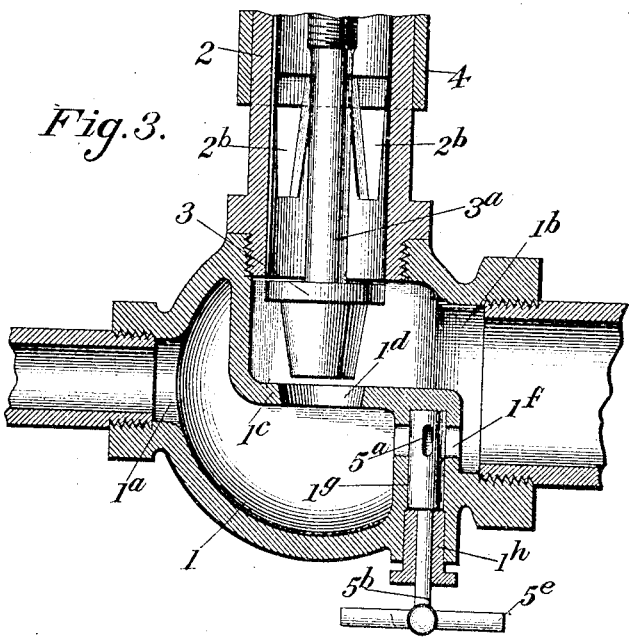

AUGUSTUS W. HARTJE, OF EVANS CITY, PENNSYLVANIA.

COMBINATION AIR AND GAS MIXING VALVE.

No. 892,255.  Specification of Letters Patent.  Patented June 30, 1908.

Application filed September 12, 1907. Serial No. 392,493.

To all whom it may concern:

Be it known that I, AUGUSTUS W. HARTJE, of Evans City, in the county of Butler and State of Pennsylvania, have invented certain new and useful Improvements in Combination Air and Gas Mixing Valves; and I hereby declare that the following is a full, clear, and exact description thereof, reference being had to the accompanying drawings, which form part of this specification.

This invention is a combination valve particularly designed for use on gas engines, and its principal object is to provide a simple and effective gas and air mixing valve, whereby (after the valve is once properly adjusted) the relative proportions of gas and air admitted will be maintained—that is the amount of air admitted will be maintained substantially uniform in proportion to the amount of gas admitted,—and the opening or closing of the gas port correspondingly opening or closing the air ports.

Another object of the invention is to provide the valve with an internal by pass port, whereby, when desired, a small amount of gas can be passed through the valve casing when the main valve is closed, as is sometimes desirable in order to maintain combustion in the engine, or in starting up the engine, and when running the engine without load.

The invention will be now explained with reference to the accompanying drawings which illustrate forms of valves embodying the invention, and will facilitate a ready understanding thereof.

In said drawings: Figure 1 is a side view of the complete air and gas mixing valve with self contained by pass. Fig. 2 is a longitudinal central section therethrough, indicating the connecting pipes, and showing the gas and air ports closed. Fig. 3 is a detail similar view showing gas and air ports open.

The valve comprises a globular casing 1 having a gas inlet $1^a$ and an outlet $1^b$, which are separated by an internal partition $1^c$ which has a main gas port $1^d$ adapted to be closed by a main valve 3 on a stem $3^a$, which extends axially outward through a cylinder 2 which is suitably connected with the casing opposite the port $1^d$ and intermediate the inlet $1^a$ and outlet $1^b$. The outer end of cylinder 2 is closed in any suitable manner, as by a head $2^a$ which has an axial internally threaded bore through which passes the stem $3^a$; said stem having a threaded engagement with the bore, as at $3^b$, so that by turning stem $3^b$, the valve 3 can be opened or closed. The cylinder 2 also has a series of triangular or V-shaped openings $2^b$ in it which form air ports—the apexes of said ports pointing toward the casing.

Fitted to slide upon the cylinder 2 is a sleeve 4, which has a head $4^a$ provided with a threaded bore through which passes the threaded stem $3^a$, but the sleeve is normally stationary relatively to the stem, and may be locked thereto by a jam nut $4^b$ on said stem, as shown. The sleeve 4 is adjusted on the stem so that it will close air ports $2^b$ in cylinder 2, when valve 3 closes gas port $1^d$. The sleeve 4 can be adjusted to any desired position relatively to valve 3 and ports $2^b$, by simply turning it upon the stem $3^b$, and locked when adjusted by nut $4^b$, so that thereafter the sleeve 4 will move with the stem $3^b$. The stem can be rotated by a hand-wheel $3^c$ fixed on its outer end in any suitable manner; a jam nut $3^d$ being shown for that purpose. Said wheel may have its periphery grooved, as shown so that if desired it can be operated by a cord or chain (not shown) from a remote point. It will be obvious from the foregoing that if the stem is turned so as to open the gas port $1^d$, the air ports $2^b$ will be simultaneously uncovered, and that owing to the peculiar shape of said air ports—the amount of air admitted increases proportionately with the amount of gas admitted; thus rendering it easy to properly regulate the relative amounts of air and gas admitted, and to maintain such proportions at all times, thus doing away with the necessity for separately adjusting the gas and air inlet valves; one operation simultaneously opening or closing both gas and air ports.

In the partition $1^e$, within the casing and at one side of gas port $1^d$, is a small by-pass port $1^f$, which is intersected by a recess $1^g$ within which recess is placed a small valve 5—preferably a turning plug having a port $5^a$ which can be turned into register with port $1^f$, so as to open the by-pass,—or turned out of register therewith and close the by-pass. Valve 5 has a stem $5^b$ passing through a stuffing box $1^h$, and having a hand piece $5^c$ on its outer end by which the valve can be manipulated. The by-pass is normally open, so that whether valve 3 be open or closed, enough gas can pass to maintain combustion in the igniting chamber, or to enable the engine to be operated when not under load. By having this by-pass valve within the casing of the main valve a great simplification of parts is realized, and a number of joints and connections heretofore required in order to make a by-pass around the main gas and air mixing valves is avoided. This internal by-pass is one of the features of my invention.

When my combined valves are applied to gas engines, I am able by opening the by-pass to start the engine and run it when no work is required of it; and when work is required the air and gas are turned on simultaneously by operating valve stem 3ª by which the gas port and air ports are opened simultaneously; the by-pass can always be left open when engine is in use.

Having thus described my invention what I therefore claim as new and desire to secure by Letters Patent thereon is—

1. In a gas and air mixing valve the combination of a valve casing having an inlet, an outlet, and an intermediate partition provided with a main port, a cylinder attached to said casing adjacent the main port and provided with air ports, a sleeve fitted to said cylinder and adapted to open or close the air ports, a valve stem extending through the cylinder and connected to said sleeve, and a valve on the said stem for closing said main port, substantially as described.

2. In a gas and air mixing valve, the combination of a casing having an inlet and outlet and a partition intermediate said inlet and outlet provided with a gas port, a cylinder attached to said casing adjacent the gas port and provided with an annular series of air ports, a valve stem extending axially through said cylinder, a valve on the inner end of said stem adapted to close said gas port, and a sleeve fitted over the cylinder and attached to said stem and adapted to close the air ports when the gas port is closed and to open the air ports as the gas port is opened.

3. In combination, a valve casing having an inlet and outlet, and a partition intermediate the inlet and outlet, provided with a main port and a by-pass port, a cylinder attached to said casing provided with air ports, a valve stem, a main valve on said stem for closing said main port, a sleeve connected with said stem for closing the air ports, and a valve for closing the by-pass port.

4. In a gas and air mixing valve, the combination of a casing having an inlet and outlet, and a partition intermediate said inlet and outlet provided with a gas port and a by-pass port; a cylinder attached to said casing adjacent the gas port and provided with annular series of air ports, a valve stem extending axially through said cylinder, a main valve on the inner end of said stem adapted to close said gas port; a sleeve fitted to the cylinder, and attached to said stem and adapted to close the air ports when the gas port is closed and to open the air ports as the gas port is opened; and a valve for closing the by-pass port, substantially as described.

In testimony that I claim the foregoing as my own, I affix my signature in presence of two witnesses.

AUGUSTUS W. HARTJE.

Witnesses:
D. R. MORROW,
J. S. FRYE.